Dec. 1, 1925.

F. G. FRYER 1,563,899

CONCH FOR THE MANUFACTURE OF CHOCOLATE

Filed Feb. 5, 1923   9 Sheets-Sheet 1

Inventor:
Frederick George Fryer,
by Byrnes, Townsend & Brickenstein,
attys.

Dec. 1, 1925.
F. G. FRYER
CONCH FOR THE MANUFACTURE OF CHOCOLATE
Filed Feb. 5, 1923
1,563,899
9 Sheets-Sheet 2

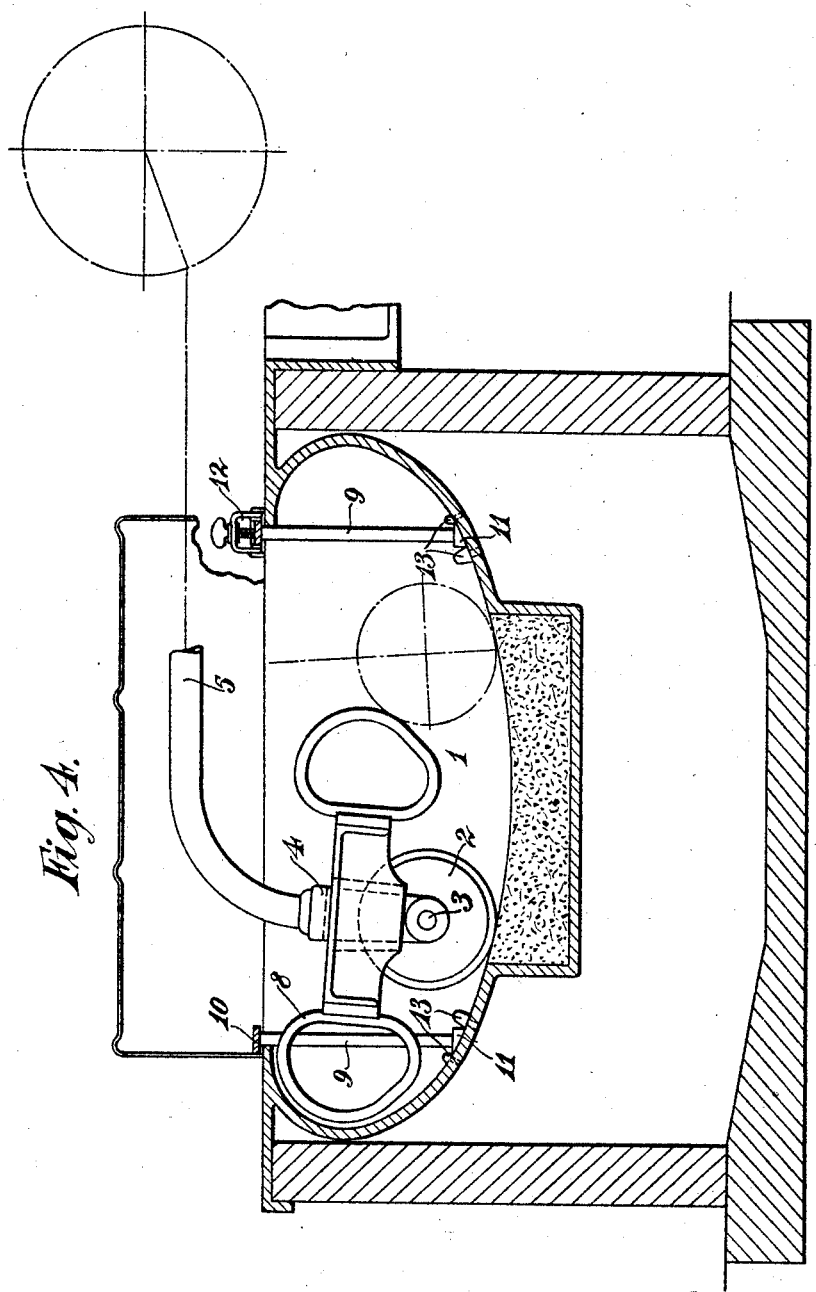

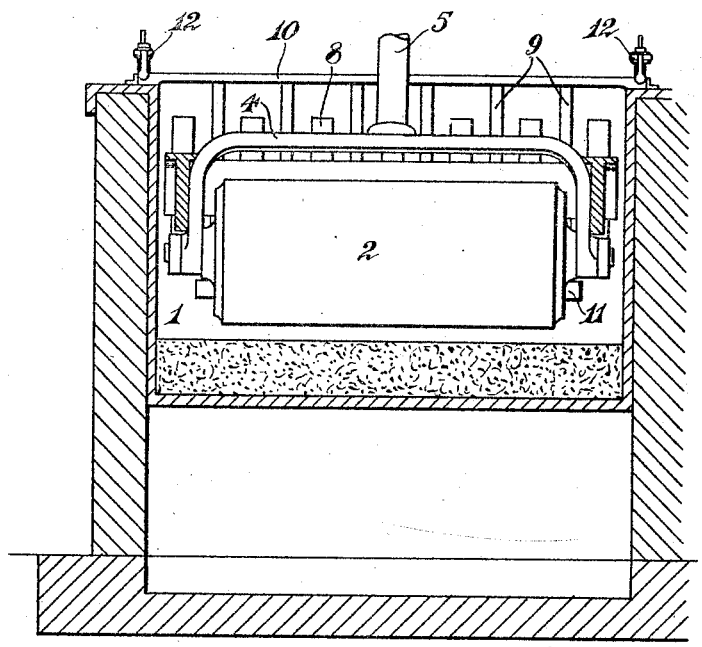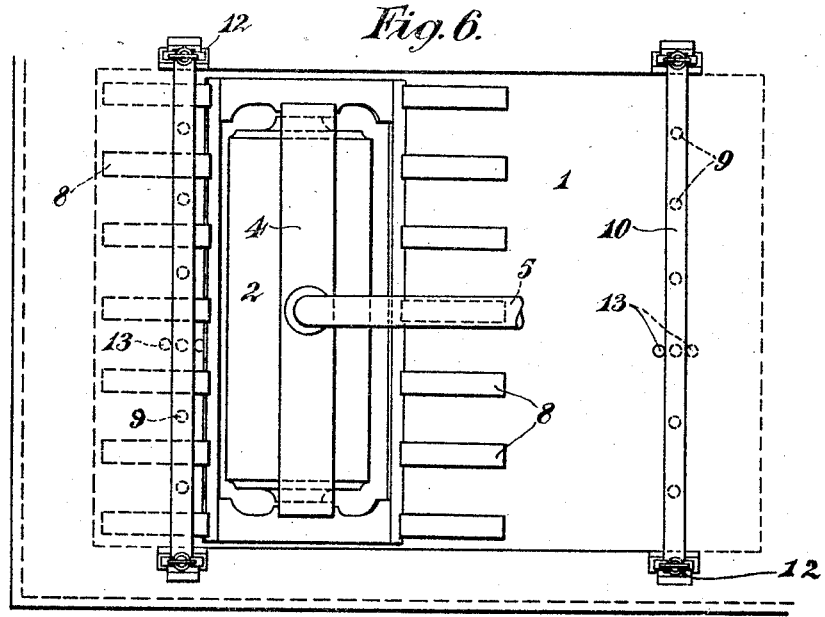

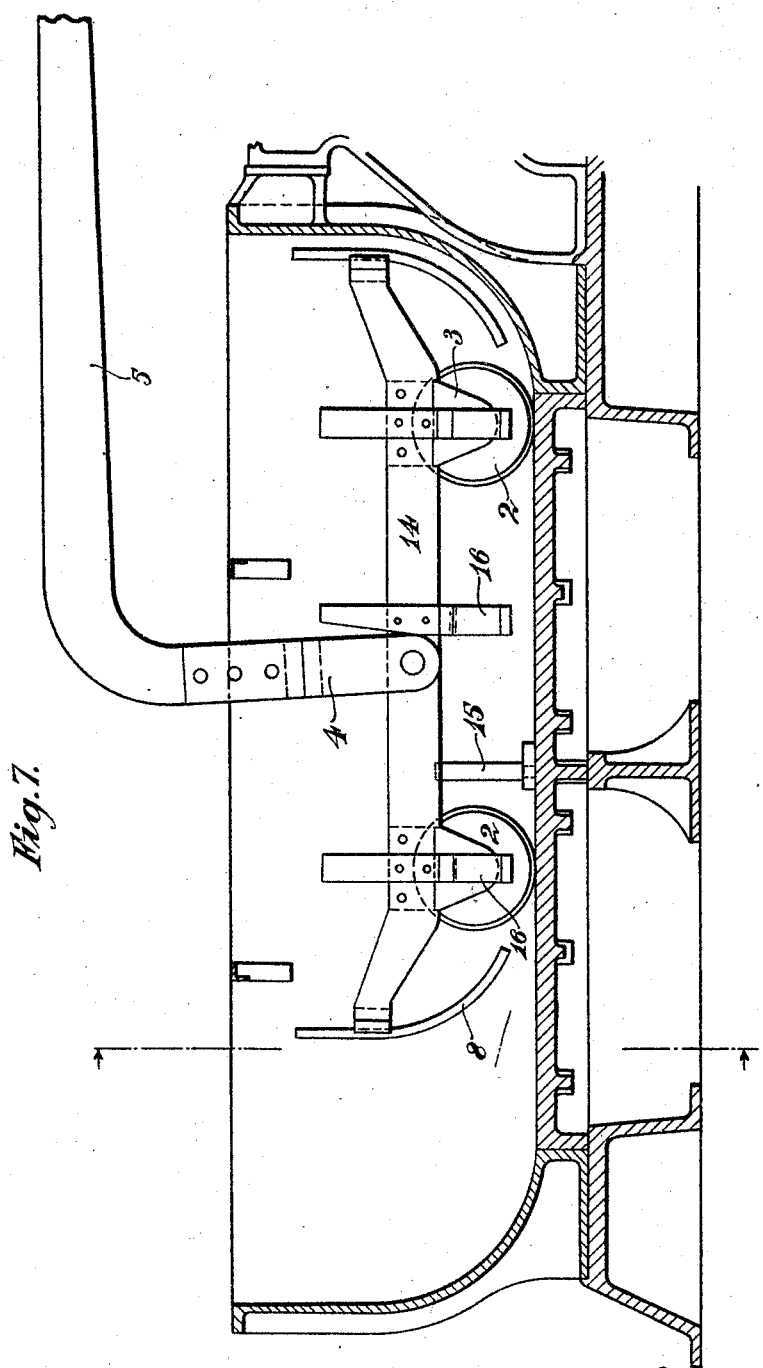

Dec. 1, 1925.  
F. G. FRYER  
1,563,899  
CONCH FOR THE MANUFACTURE OF CHOCOLATE  
Filed Feb. 5, 1923    9 Sheets-Sheet 6

Dec. 1, 1925.  F. G. FRYER  1,563,899
CONCH FOR THE MANUFACTURE OF CHOCOLATE
Filed Feb. 5, 1923   9 Sheets-Sheet 8

Patented Dec. 1, 1925.

1,563,899

UNITED STATES PATENT OFFICE.

FREDERICK GEORGE FRYER, OF YORK, ENGLAND.

CONCH FOR THE MANUFACTURE OF CHOCOLATE.

Application filed February 5, 1923. Serial No. 617,058.

*To all whom it may concern:*

Be it known that I, FREDERICK GEORGE FRYER, a subject of the King of the United Kingdom of Great Britain and Ireland, residing at 9 St. Peter's Grove, York, England, have invented certain new and useful Improvements in Conches for the Manufacture of Chocolate (for which I have filed an application in Great Britain on 10th February, 1922, and Germany on 2nd November, 1922), of which the following is a specification.

This invention relates to conches and like machines used in the manufacture of chocolate and has for its object not only to improve the action of these machines by enabling them to liquefy more rapidly chocolate which has been placed in them in a too stiff or insufficiently heated state, but also to accelerate the normal conching action of the machines on chocolate in the proper condition of fluidity, that is, to rub and agitate said chocolate to an increased extent.

Conch machines vary in details of design but in their main characteristics they are similar, and comprise a trough or pot provided with means of attrition for rubbing and/or agitating the chocolate contained therein. Said means usually consist of a roller (or rollers) which is reciprocated horizontally in the trough or pot by suitable arms or other driving members.

According to the present invention there are provided at or near each end of the conch trough, one or more racks, combs, sieves, bars, grids or like members, whereby a rubbing, agitating, breaking up or comminuting action is effected on the chocolate mass or liquor, owing to the said mass or liquor, which is set in motion by the action of the reciprocating roller or other agitating means, being pushed against and/or through or between said racks or like members.

The said racks or the like may be stationary, in which case they may either be permanently fitted in the trough or they may be adjustable or removable and interchangeable, but they are preferably provided with means whereby they are periodically partially or wholly withdrawn from the normal path of the chocolate, which flows backwards and forwards in the trough owing to the action of the reciprocating roller, or other agitating means, in order that that portion of the chocolate which has been pushed through or between them into the ends of the conch may flow or be drawn back into the normal path of the roller. To this end, the said racks may be alternately raised vertically out of the trough at each stroke of the agitating means (being fixed for example, to the end of a beam which is oscillated by suitable means) or they may be partially rotated in which case, for example, one end may be pivoted to the sides of the trough and the other end connected by a suitable driving member to the agitating means.

The new means are particularly, but not exclusively applicable to the improved conch which forms the subject matter of the invention described and claimed in the specification of the application for Letters Patent No. 31,342 dated 23rd November, 1921.

If the conch pot be provided with two or more rollers or other agitating means similar racks, combs, sieves, grids, bars or the like may be fitted in or about the middle of the trough, i. e., between the rollers, instead of or in addition to those at the ends. The provision of means for periodically withdrawing the racks or the like is not necessary for the central racks or the like, since the chocolate is pushed through them in both directions by the rollers.

Various embodiments of the invention are illustrated by way of example, in the accompanying drawings, in which—

Figs. 4, 5 and 6 represent, in similar views, a conch in accordance with the invention described and claimed in the aforesaid specification No. 31,342 of 1921 also having stationary grids fitted near the ends of the trough.

Figure 8:
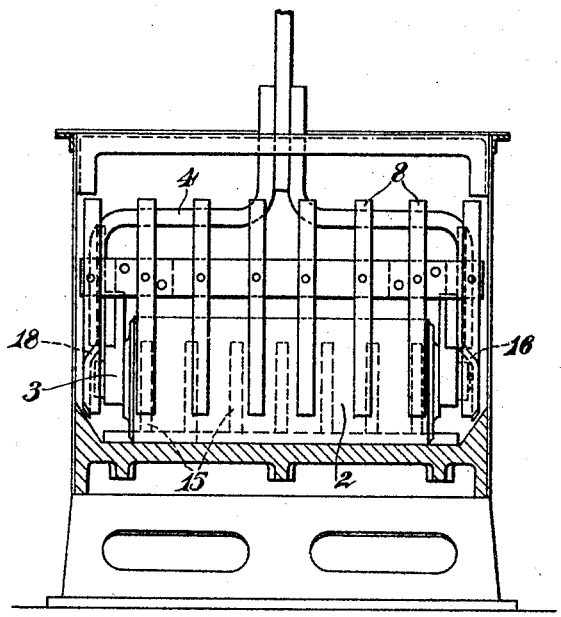
Figure 9:
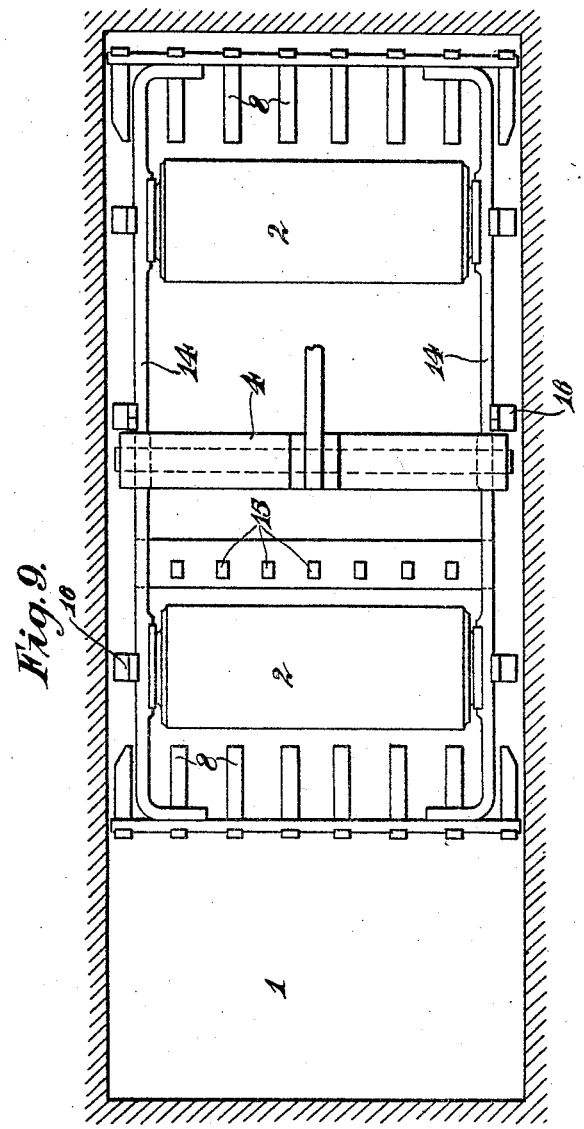
Figure 10:
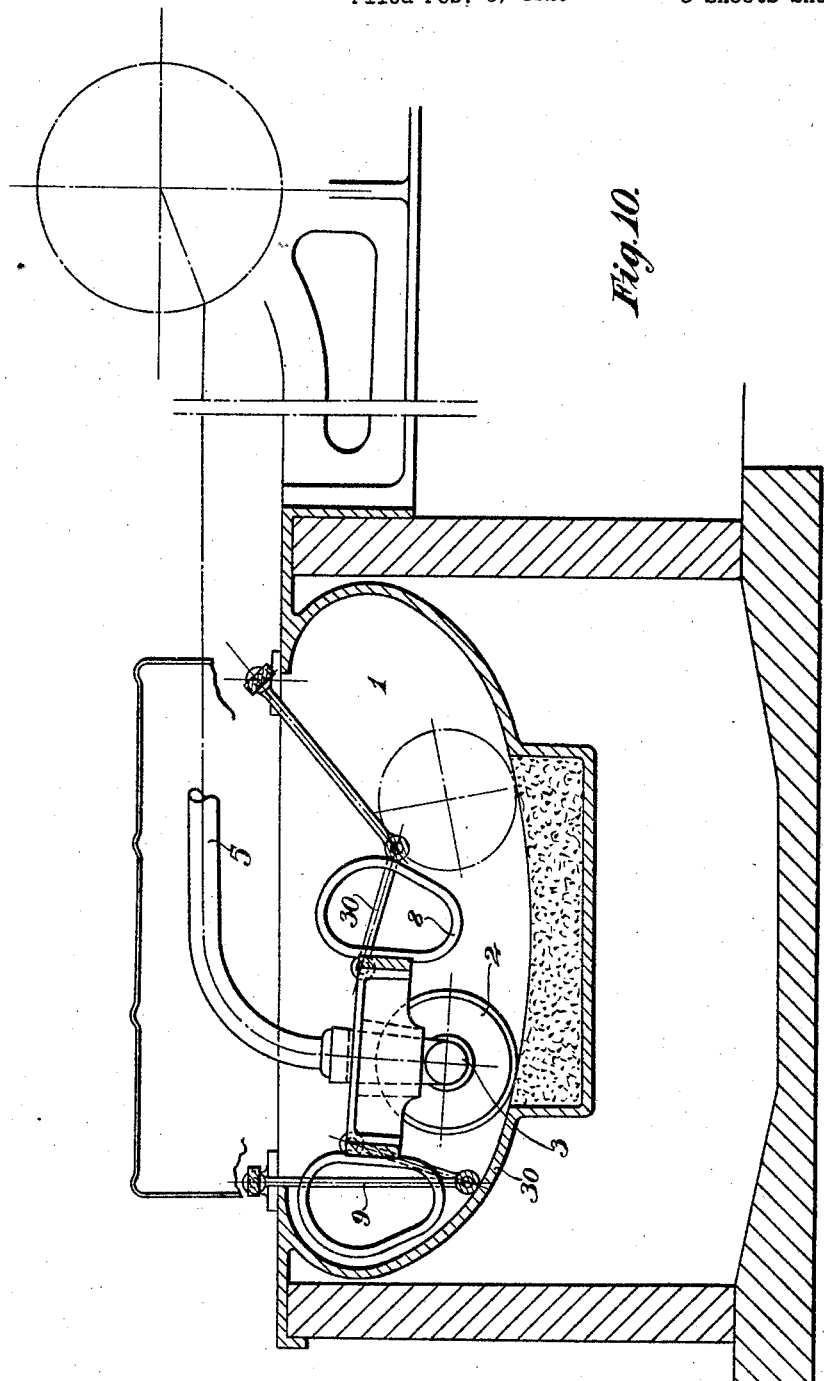
Figure 11:
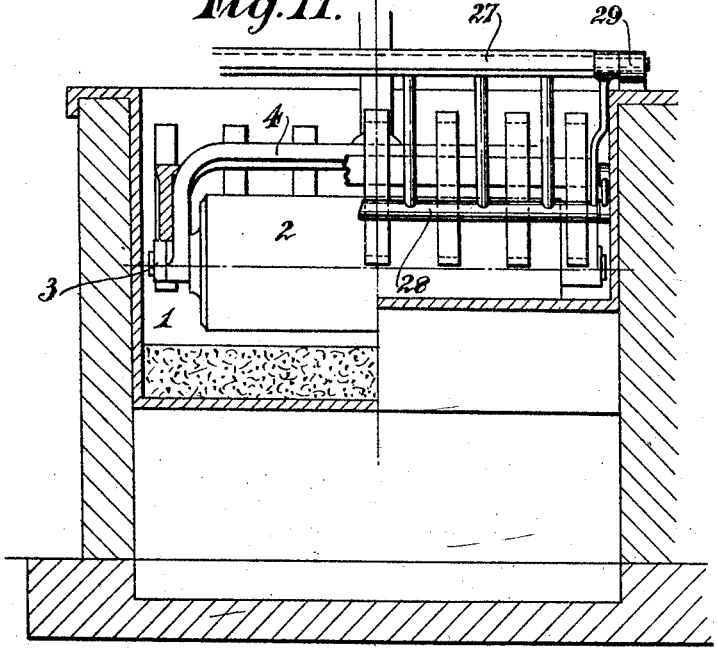
Figure 12:
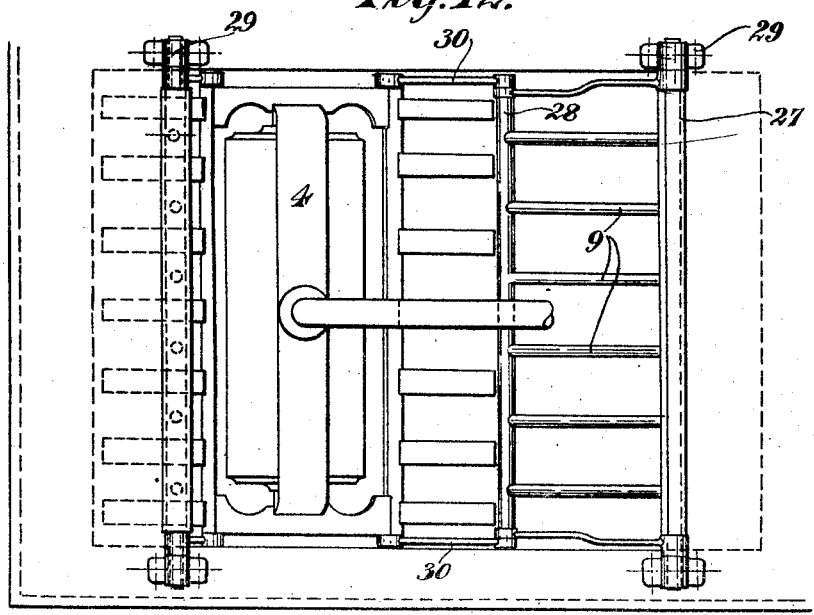

Figs. 7, 8 and 9 represent, in similar views, a double-roller conch provided with rakes or like stirring means in accordance with the aforesaid prior specification and having a stationary grid fitted near the centre of the trough, and Figs. 10, 11 and 12 represent in sectional side elevation, sectional end elevation and plan respectively a similar conch to that illustrated in Figs. 4–6 and provided with means for partially rotating the grids.

In all the figures of the drawings like parts are indicated by like reference numerals.

Figure 1:
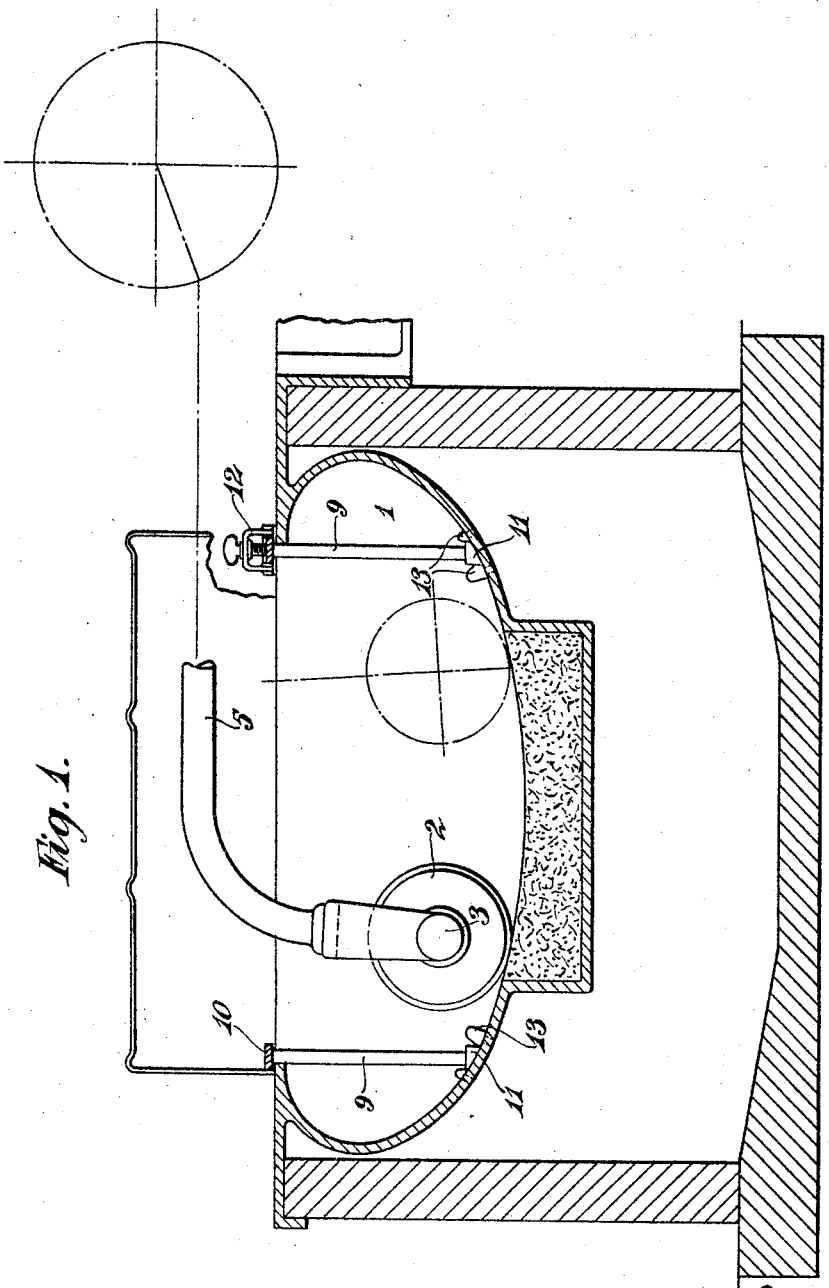
Figs. 1, 2 and 3 represent in sectional side elevation, sectional-end elevation and plan respectively, an ordinary conch having stationary bars or grids fitted near the ends of the trough.
Figure 2:
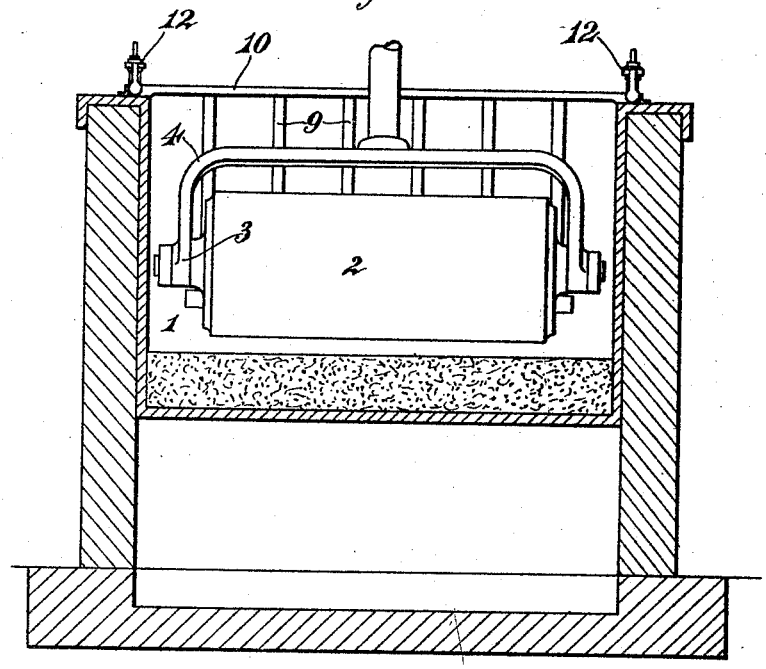
Figure 3:
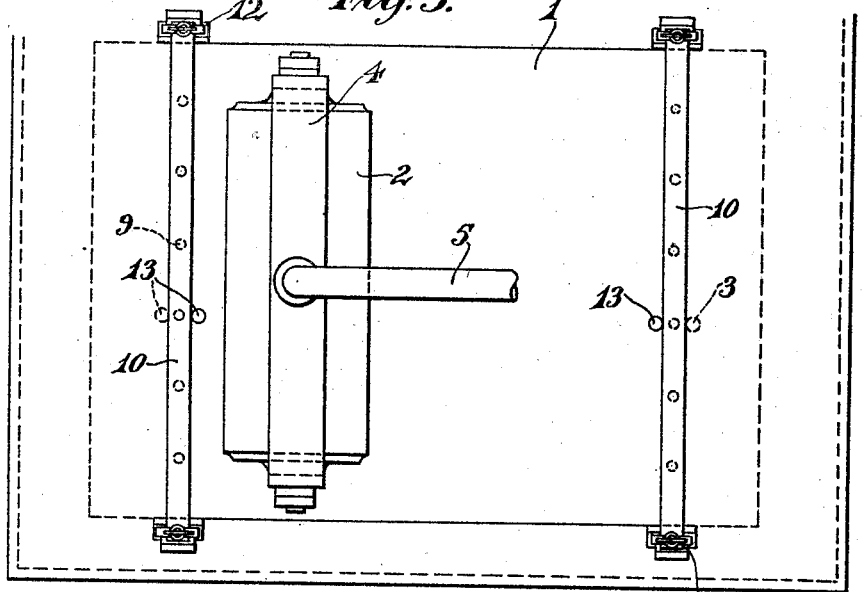

Referring now to Figs. 1–3, 1 is the pot or trough of the conch which contains the chocolate and in which the roller 2, which is journalled in bearings 3 in the arms of the forked member 4, is reciprocated in the usual manner between the two extreme positions indicated by the full and dotted lines in the drawing by means of a rod 5 of which one end is connected to the member 4 and the other end to a suitable crank or eccentric which is illustrated diagrammatically in the drawing. According to the invention there are provided near both ends of the pot 1, a number of vertical bars 9 arranged across the width of the pot and parallel to the roller. The ends of said bars 9, in order that they may be easily fitted in the trough, are connected by any suitable means to two horizontal bars 10 and 11, which latter are fixed to the trough by means of bolts or rivets 12 and 13. In operation, the said bars 9 rub and agitate the chocolate which is pushed against and between them by the action of the reciprocating roller or other means of attrition and thus increase and accelerate the conching effect of the machine. Obviously this form of machine is suitable only for treating chocolate when in the proper condition of fluidity, as, if the chocolate were not sufficiently fluid, the grids would tend to retain a portion of the chocolate at the ends of the conch and out of the path of the reciprocating roller.

Referring to Figs. 4–6, the machine illustrated therein is similar to the preceeding machine, and only differs therefrom in that the bars 9 are fitted to a conch of the type described and claimed in the aforesaid specification No. 31,342 of 1921, wherein the reciprocating roller is provided with a number of stirring or raking members 8, which are arranged in front of and behind the roller and reciprocate with it. The bars 9 are so arranged that the members 8 pass between them at each stroke, and thereby increase or accelerate the action of the machine.

Referring to Figs. 7–9, 1 is the trough in which operate two rollers 2 fitted in bearings 3 attached to a frame 14, which is reciprocated by means of a forked member 4 and an arm 5, of which one end is attached to the member 4 and the other to a suitable crank or eccentric which is not shown in the drawing. The frame 14 is provided at either end with a number of prongs 8 which move backwards and forwards with the rollers 2, and additional side prongs 16 are also provided. According to the invention, there is provided between the rollers at about the centre of the trough a number of vertical bars 15 between which the chocolate is pushed backwards and forwards by the rollers, the conching effect of which is thereby considerably increased.

Referring now to Figs. 10–12, the bars 9 forming the grids are fitted at their upper and lower ends to the cross-pieces 27 and 28 respectively. The upper cross-pieces 27 are pivoted in bearings 29 fitted to the top of the trough, while the lower cross-piece 28 is pivotally connected at either end by means of the driving members 30 to the arms of the reciprocating roller. In operation, as the roller moves to the right from the extreme left position illustrated by the full lines in Fig. 10 the cross-pieces 27 turn in the bearing 29 and the bars 9 to the right of the figure turn with them and gradually assume a vertical position as shown on the left-hand side of Fig. 10 at the same time the raking members 8 gradually approach the said bars 9 and finally at the end of the stroke have passed between them, thereby thoroughly rubbing the chocolate. On the return stroke, the members 8 are withdrawn from between the bars 9 the cross-pieces 27 turn in the bearings 29 until the position shown in the right-hand side of Fig. 10 is arrived at. In this position chocolate which may have been left in the clearance space at the end of the trough can flow back freely into the normal path of the roller.

It will be clear that, in a conch provided with racks or like members in accordance with the invention, a greater rubbing and/or agitating action is produced on the chocolate than if said racks or the like were not present, and that therefore the efficiency of the machine is increased.

I claim:—

1. In a conch, the combination of a vessel, means movable transversely of the vessel for subjecting the chocolate to attrition, and grid-like means connected with the vessel for separately rubbing the chocolate.

2. In a conch, the combination of a vessel, means movable transversely of the vessel for subjecting the chocolate to attrition and stationary grid-like means connected with the vessel for separately rubbing the chocolate.

3. In a conch, the combination of a vessel, means movable transversely of the vessel for subjecting the chocolate to attrition, grid-like means connected with the vessel for separately rubbing the chocolate and means connected with said means of attrition and movable therewith for separately agitating the chocolate.

4. In a conch, the combination of a vessel, a roller therein for subjecting the chocolate to attrition, and grid-like means connected with the vessel for separately rubbing the chocolate.

5. In a conch, the combination of a vessel, a roller therein for subjecting the chocolate to attrition, and stationary grid-like means connected with the vessel for separately rubbing the chocolate.

6. In a conch, the combination of a vessel, a roller therein, for subjecting the chocolate to attrition, and stationary grid-like means connected with the vessel for separately rubbing the chocolate and means connected with said means of attrition and movable therewith for separately agitating the chocolate.

7. In a conch, the combination of a vessel, means movable transversely of the vessel for subjecting the chocolate to attrition, and a plurality of bars connected with the vessel for separately rubbing the chocolate.

8. In a conch, the combination of a vessel, means movable transversely of the vessel for subjecting the chocolate to attrition, and a plurality of parallel bars connected with the vessel for separately rubbing the chocolate.

9. In a conch, the combination of a vessel, means movable transversely of the vessel for subjecting the chocolate to attrition, and a plurality of vertical parallel bars connected with the vessel for separately rubbing the chocolate.

10. In a conch, the combination of a vessel, means movable transversely of the vessel for subjecting the chocolate to attrition, and a plurality of bars connected with the vessel at each end for separately rubbing the chocolate.

11. In a conch, the combination of a vessel, means movable transversely of the vessel for subjecting the chocolate to attrition and a plurality of bars detachably connected with the vessel for separately rubbing the chocolate.

12. In a conch, the combination of a vessel, means movable transversely of the vessel for subjecting the chocolate to attrition, two horizontal bars connected with the vessel and a plurality of bars connected with said horizontal bars for separately rubbing the chocolate.

13. In a conch, the combination of a vessel, a roller therein for subjecting the chocolate to attrition, two horizontal bars detachably connected with the vessel and a plurality of vertical bars connected with said horizontal bars for separately rubbing the chocolate.

14. In a conch, the combination of a vessel, a roller therein for subjecting the chocolate to attrition, two horizontal bars detachably connected with the vessel and a plurality of vertical bars connected with said horizontal bars for separately rubbing the chocolate and means connected with said means of attrition and movable therewith for separately agitating the chocolate.

15. In a conch, the combinaton of a vessel, means movable transversely of the vessel for subjecting the chocolate to attrition, grid-like means connected with the vessel for separately rubbing the chocolate and prongs connected with said means of attrition and movable therewith for separately agitating the chocolate.

16. In a conch, the combination of a vessel, a roller therein, for subjecting the chocolate to attrition, and stationary grid-like means connected with the vessel for separrately rubbing the chocolate and prongs connected with said means of attrition and movable therewith for separately agitating the chocolate.

17. In a conch, the combination of a vessel, a roller therein for subjecting the chocolate to attrition, two horizontal bars detachably connected with the vessel and a plurality of vertical bars connected with said horizontal bars for separately rubbing the chocolate and prongs connected with said means of attrition and movable therewith for separately agitating the chocolate.

18. In a conch, the combination of a vessel, a roller therein for subjecting the chocolate to attrition, two horizontal bars detachably connected with the vessel and a plurality of vertical bars connected with said horizontal bars for separately rubbing the chocolate and prongs connected with said means of attrition and movable therewith for separately agitating the chocolate, said prongs having a profile corresponding to the shape of the wall of the vessel.

FREDERICK GEORGE FRYER.